Patented May 12, 1953

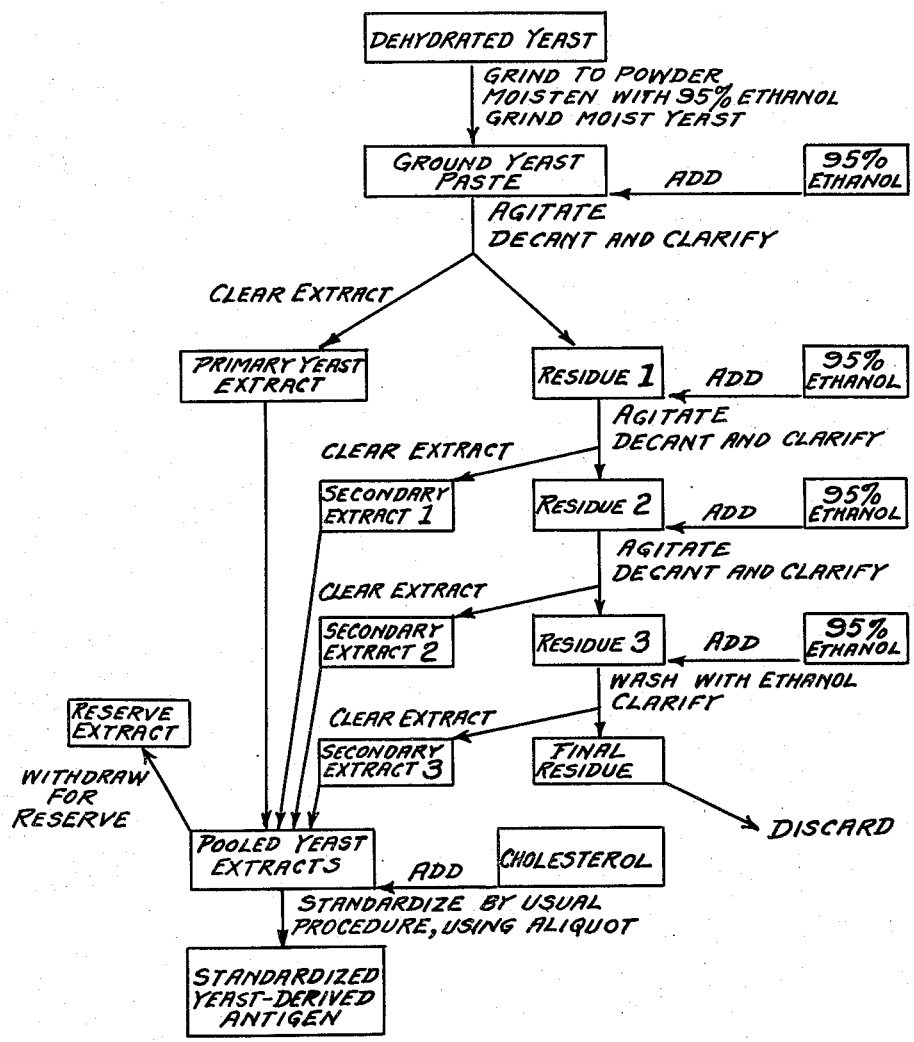

2,638,435

UNITED STATES PATENT OFFICE 2,638,435

ANTIGEN FOR DETERMINATION OF SYPHILIS AND PROCESS OF MAKING THE SAME FROM YEAST

Paul Fugazzotto, Indianapolis, Ind.

Application November 17, 1948, Serial No. 60,626

5 Claims. (Cl. 167—84.5)

This invention relates to a substance commonly known as an antigen and to the process of making the same. More specifically, the invention relates to an antigen or indicator for the determination of the presence of syphilis.

Heretofore there have been numerous procedures proposed for the production of antigens, together with the processes of making them. These antigens have been used with various techniques for testing body fluids for evidence of syphilis. While improvements have been made in the quality of the antigens employed, all have heretofore been found lacking in that nonspecific reactions have attended their use. Furthermore, each of these antigens has left much to be desired in providing more sensitive results in the sera of syphilitic patients.

In the antigens heretofore employed, the basic raw material used has been of animal origin; i. e., beef heart or from beef heart plus egg yolk; for example, even the popularized cardiolipin antigen has been obtained from beef heart.

It is the primary object of the present invention to provide an antigen which possesses the quality of a high degree of specificity combined with a high degree of sensitivity.

The primary feature of the present invention resides in the use of an antigen derived from a raw material of vegetable origin, and more particularly yeast.

It is a further object of the present invention to provide an antigen possessing comparable physical and serological properties to those antigens prepared from raw material of animal origin such as beef heart or beef heart plus egg yolk.

It is a still further object of the present invention to provide an antigen of such character that uniform results will attend its use.

It has been determined that antigens formed from raw materials of animal origin are frequently unpredictable. For example, great care must be exercised in handling beef heart from the moment it is removed from the animal until the dehydrated pulverized muscle has been subjected to the various extractions. No single manipulation or group of manipulations has heretofore been devised to enable the user to predict with any degree of certainty of the success of the antigen to be prepared therefrom.

It is a still further object of the present invention to produce an antigen which may be produced without elaborate or expensive purification procedures and which will result in a uniform antigen.

The antigen

The raw material used as a source of this new antigen is yeast obtainable on the open market in the moist or dehydrated states. While the best results have been obtained with baker's yeast, which of course can be cultured and propagated on a suitable medium in the laboratory, it has been determined that brewer's yeast also contains the antigenic ingredient.

Like beef heart antigens employed at the present time, extracts of yeast are chiefly lipoidal in composition, although investigation of comparative extractions indicates the presence of a participating carbohydrate component apparently as a side chain in a lipid molecule. These extracts are also similar to beef heart antigens in that they require the addition of cholesterol for enhancement of serologic sensitivity; and the solids are thrown out of solution by admixture with water or physiologic salt solution. However, since the yeast cell system is much simpler in composition than the muscle cell system of beef heart, such yeast extracts differ therefrom in that they are much purer. That is, they are less inclined to contain conflicting non-participating or "false-reacting" components.

Preliminary preparation of raw material

Where active baker's yeast is obtained in the dehydrated state, it is ground into a rather fine powder through the use of sterile clean dry sand or any other convenient means. Where active baker's yeast obtained in the moist state either on the open market or from a laboratory culture medium, is used, it should first be dehydrated as follows:

It is spread out in a thin layer on porcelain dishes or glass plates and placed in a dry air incubator held at from 37° to 40° C., the incubator being provided with a suitable air circulating system. The substance is stirred periodically and its consistency noted from time to time. This consistency is at first putty-like in appearance, later rubber-like, and finally rather hard and brittle. For greatest facility in handling, it must not be allowed to dry beyond the stage where it is still pliable under the spatula. Baker's yeast will generally lose approximately 70% of its weight during this process.

In the event brewer's yeast is used, it is first desirable to wash out the impurities of the brewing process thereby assuring a purer antigen. The washing is done as follows: the yeast powder is weighed and transferred to bottles of suitable size containing 2.0 ml. of distilled water for each gram of powder. The mixture is stirred thoroughly for about ten minutes, preferably with a mechanical mixer, and the wash water is then removed either by filtration in a Büchner filter under reduced pressure, or better still by centrifugation. The washing is repeated two or more times in the same manner, except that five minutes of thorough stirring is desirable before removal of the wash water. After the material is washed sufficiently, it is subjected to the same drying process as described above in connection with active baker's yeast obtained in the moist state.

*Preparation of antigen extract*

The extraction of the yeast powder is accomplished as follows:

An amount of powder is weighed and then transferred to a mortar or a Waring Blendor to which is added just enough 95% ethyl alcohol to make a rather thick fluid paste. The mixture is ground for 15 minutes if it has been placed in a mortar or for five minutes if a Waring Blendor is used. During the grinding operation small portions of alcohol are added to maintain the thick fluid consistency of the material. The mixture is then transferred to a Pyrex bottle of suitable size, which is stoppered with a glass cork or tin foil covered cork; a volume of 95% alcohol equivalent to 4.0 ml. for each gram (original dry weight of powder) is then added. Some of this alcohol should be used to aid in transferring the material to the Pyrex bottles. The extracting mixture is placed in the dark at room temperature and agitated thoroughly several times a day for two days. After it has stood overnight undisturbed the supernatant liquid is decanted into suitable centrifuge tubes (or a filter) to be cleared. The clear extract is stored in appropriate Pyrex bottles and the residue, if any appreciable amount was carried over from the extracting bottle, is returned thereto. To all of this residue is added 2.0 ml. of 95% ethyl alcohol per gram (original dry weight) of yeast employed, and a second extraction is made as above. The supernatant liquid is decanted as in the first extraction and then a third extraction is made as in the second extraction.

Finally, the extracted residue is washed three times with a volume of 95% alcohol equivalent to 1.0 ml. for each gram (original dry weight) of yeast employed, sedimenting the residue each time in the centrifuge at about 2000 R. P. M. to obtain the clear supernatant. All washings and extractions are pooled in a Pyrex bottle and agitated several times daily for three or four days. Approximately one-third of the extract is set aside while cholesterol (Phanstiehl ash-free) is added to the major portion in an amount equivalent to 0.5 gram per 100.0 ml. of extract. The bottle of extract may be heated in a water bath at 56° C. to hasten solution of the cholesterol, and the final product is then filtered (gravity filter) before standardization.

*Use of the antigen*

In order to use this cholesterolized extract of yeast in the serology of syphilis, it is necessary first of all to prepare a suitable suspension of the dissolved lipoids. This is accomplished by admixture with physiologic salt solution (amount determined by titration). The customary method of making this mixture is (as described by Kolmer for beef heart antigens) by adding the extract drop by drop to the required amount of saline. However, it has been found that more sensitive suspensions are obtained if the extract is first mixed with a small amount of saline (as determined by experimentation) and allowed to stand from seven to ten minutes before the mixture is brought up to proper dilution with further addition of saline.

*The test*

To tubes containing 0.02 ml. of inactivated patient's serum (or 0.1 to 0.2 ml. of spinal fluid) is added 0.1 ml. of the antigen suspension mentioned above. The tubes are thoroughly shaken and allowed to stand at room temperature for from ten to twenty minutes before the required amount of guinea pig complement is added (usually two units in diagnostic tests). The tubes are again agitated, placed in a refrigerator at from four degrees to eight degrees C. for from four and one-half to five hours, and then at room temperature for fifteen minutes. Sensitized red blood cells (sheep) are added—0.2 ml. of 2½% suspension—the tubes agitated and then placed in a water bath at 37° C. for fifteen minutes. The final results are read and recorded in the customary manner.

*Comparative tests*

A properly standardized antigen is one which possesses a high capacity for detection of the presence of syphilis. However, it is likewise desirable that the antigen avoid false reactions in conditions other than syphilis. All antigens developed to date by the various authors have been known to give certain percentages of false reactions. This includes even the highly purified cardiolipin antigens.

Tests have been made with the present antigen through the medium of the complement fixation testing system using guinea pig serum. As is commonly known, this serum is one of the reagents used in this type of test to aid in the detection of syphilis in a patient's sera. Any antigen which reacts with the guinea pig (complement) sera will give a tendency towards false reactions when employed in routine tests on human sera and spinal fluids. In the following table are given results of complement fixation tests for syphilis on a group of 27 guinea pigs tested with the yeast antigen of this invention as compared to four other well known antigens. The guinea pig numbers that are missing represent those which were negative with all antigens:

SPECIFICITY COMPARISON

| Guinea Pig No. | Antigen | | | | |
|---|---|---|---|---|---|
| | N. Y. | Harris | Kol. | Kahn 162 | Yeast |
| 3 | — | — | 85 | 95 | — |
| 4 | — | — | 99+ | 95 | — |
| 6 | — | — | 99+ | 97 | — |
| 7 | — | — | 99 | 95 | — |
| 8 | — | — | 00 | 70 | — |
| 10 | — | 00 | 70 | 70 | — |
| 11 | 90 | 95 | 00 | 40 | — |
| 12 | 99+ | 80 | 50 | 40 | — |
| 13 | — | — | 90 | 80 | — |
| 14 | — | — | 95 | 90 | — |
| 15 | — | — | 70 | 60 | — |
| 16 | — | — | 85 | 80 | — |
| 17 | 00 | 00 | 70 | 50 | 99 |
| 18 | — | — | 60 | 80 | — |
| 19 | — | — | 95 | 90 | — |
| 20 | — | — | 00 | 50 | — |
| 21 | — | — | 99 | 95 | — |
| 22 | — | — | 99 | 95 | — |
| 23 | 60 | 00 | 00 | 00 | 50 |
| 25 | — | — | 80 | 92 | — |
| 26 | — | — | 80 | 80 | — |
| 27 | — | — | 97 | 99 | |

NOTE.—The N. Y. and Harris antigens are cardiolipin antigens. The "Kol." represents the Kolmer complement fixation antigen. The Kahn 162 antigen is the Kahn flocculation test antigen titrated for use in the complement fixation tests. All antigens were used at optimal dilution under identical conditions. The number and symbols represent degrees of hemolysis from zero (00 to 40, 50, 60, 70, et cetera) to (—) complete, representing highly positive (00) to weaker positive (40, 50, 60, et cetera) to negative (—) respectively.

From this table it is evident that the cardiolipin antigens showing a great percentage of negatives would be less likely to give false reactions when employed in routine tests. In 22 out of the 27 guinea pig tests there was a reaction with the routine Kolmer antigen and with the particular lot (162) of the Kahn antigen. Only 2 of the 27 reacted with the yeast antigen indicating that this antigen is less likely to give false reactions than even the cardiolipin antigens which reacted with four guinea pigs in one series of tests (the N. Y.) and in five with the other (Harris). It is, therefore, evident that the yeast antigen does meet the requirement of minimal reactivity with guinea pig serum, which as has already been stated is used as a reagent in complement fixation tests.

Experience with many other antigens, particularly those extracted from beef heart, has shown that failure of an antigen to react with guinea pig serum, though extremely essential, does not necessarily mark it as a superior product, for such other antigens may also be undersensitive to syphilitic sera as well. With this experience in mind, comparative tests were made on human specimens to check the yeast antigen for this property of sensitivity. The following chart shows the results:

SENSITIVITY COMPARISON

| Serum Specimen No. | Antigen | |
|---|---|---|
| | Kahn 162 | Yeast |
| 475 | — | — |
| 9 | 4 | 4 |
| 10 | — | — |
| 12 | 4 | 4 |
| 191 | 4 | 4 |
| 299 | 3⁴ | 3 |
| 5 | — | ± |
| 69 | 4 | 4 |
| 413 | — | — |
| 414 | 3⁴ | 4 |
| 515 | — | — |
| 630 | 4 | 4 |
| 1 | — | — |

Note.—The results given (—, ±, 1, 2, 3, 4+) represent, respectively, increasing order of positivity from negative (—) to strong positive (4).

It is apparent from these tests that the yeast antigen not only is more specific in that it displays a lower reactivity with false reacting sera (guinea pig), but as well, is just as sensitive as the beef heart antigens currently in use.

Comparative tests were also made on a group of 116 patients' sera of whom 35 were known syphilitics and 81 were known to be nonsyphilitic. Of the syphilitics all but 4 were found to react with the yeast antigen. Of the nonsyphilitics only two gave reactions in the diagnostic tests, but these were not strong enough to be reportable. These 116 specimens were part of a series of approximately 350 specimens distributed by the United States Public Health Service in the annual serology evaluations of 1948.

In the following table are given the comparative results in connection with the above mentioned tests, of the syphilitic specimens for which less than a 4+ was obtained with either or both antigens. The specimen numbers are those of the United States Public Health Service (V) series 1948 evaluation survey:

| Specimen No. | Antigen | | | | |
|---|---|---|---|---|---|
| | Kolmer—Tube Nos. | | Yeast—Tube Nos. | | |
| | 1 | 2 | 1 | 2 | |
| 2 | 2³ | 3 | 4 | 4 | Neural Syphilis. |
| 3 | — | 2 | 4 | 4 | Do. |
| 5 | 2 | 3 | 4 | 4 | Do. |
| 12 | — | — | — | + | Do. |
| 14 | — | — | — | + | Early Latent Syphilis. |
| 18 | 3⁴ | 4 | 4 | 4 | Do. |
| 20 | x | 3⁴ | 3⁴ | 4 | Neural Syphilis. |
| 22 | — | — | + | 4 | Late Latent Syphilis. |
| 23 | x | 1 | x | 3 | Primary Syphilis. |
| 29 | — | ± | 3 | 4 | Late Latent Syphilis. |
| 28 | 2 | 3⁴ | 4 | 4 | Do. |
| 150 | — | ± | 4 | 4 | Cardiovascular Syphilis. |
| 180 | 2 | 3⁴ | 4 | 4 | Neuro Syphilis. |
| 181 | 3 | 3⁴ | 3⁴ | 4 | Visceral Syphilis. |
| 193 | — | — | — | — | Late Latent Syphilis. |
| 19 | — | — | — | — | Late Latent Primary Syphilis. |

In conclusion, it is apparent that the antigens prepared from yeast, as heretofore described, have been found to offer minimal interference in the presence of reagents (guinea pig serum) used, and to compare more than favorably with other antigens in complement fixation tests on non-syphilitic sera. This present antigen appears to have a sensitivity equal to or higher than other antigens already in use and with smaller risks of giving false reactions. It has not been necessary in the production of this antigen to resort to the rather elaborate procedures described in the literature of other authors for their antigens, involving as they do preliminary extractions with ether, acetone, or both; precipitations; evaporations and redissolutions, all of which are time consuming, wasteful and in every way expensive, especially since these manipulations are merely preparatory in most cases to the final extraction with alcohol. With the exception of the simple washing which appears to be necessary in the case of brewer's yeast and the dehydration of the yeast in the moist state, no other manipulation appears to be required preparatory to the alcohol extraction of the desired component from the yeast.

While the invention has been described in great detail in the foregoing description, such detail is to be considered as illustrative only and not restrictive in character.

The invention claimed is:

1. An antigen for use in serologic tests for syphilis, comprising yeast lipoids derived from extraction of dehydrated yeast with alcohol, with cholesterol added thereto.

2. A diagnostic antigen for serologic testing, comprising substances derivable from dehydrated yeast by extraction with 95% ethanol at room temperature, to which cholesterol has been added.

3. An antigen for use in serologic tests for syphilis consisting of an ethanol solution containing cholesterol and water-insoluble lipoids derived from dehydrated yeast.

4. The process for the preparation of antigenic material from yeast, which comprises extracting comminuted dehydrated yeast with substantially water-free alcohol at room temperature, removing undissolved material from the alcoholic extract, and adding cholesterol to the resulting alcohol solution.

5. The process according to claim 4, in which the alcohol is 95% ethanol.

PAUL FUGAZZOTTO.

References Cited in the file of this patent

UNITED STATES PATENTS

| Number | Name | Date |
|---|---|---|
| 2,111,976 | Laughlen | Mar. 22, 1938 |
| 2,320,479 | Sperti | June 1, 1943 |

OTHER REFERENCES

J. Biol. Chem., volume 137, February 1941, pages 525 to 533.